US008309909B2

(12) United States Patent
Dikovsky et al.

(10) Patent No.: US 8,309,909 B2
(45) Date of Patent: Nov. 13, 2012

(54) ATOMCHIP DEVICE

(75) Inventors: Valery Dikovsky, Beer Sheva (IL); Ron Folman, Rehovot (IL); Yoni Japha, Rehovot (IL)

(73) Assignee: B.G. Negev Technologies and Applications, Beer Sheva (IL)

( * ) Notice: Subject to any disclaimer, the term of this patent is extended or adjusted under 35 U.S.C. 154(b) by 795 days.

(21) Appl. No.: 11/816,172

(22) PCT Filed: Jan. 29, 2006

(86) PCT No.: PCT/IL2006/000118

§ 371 (c)(1), (2), (4) Date: Mar. 14, 2010

(87) PCT Pub. No.: WO2006/085299

PCT Pub. Date: Aug. 17, 2006

(65) Prior Publication Data

US 2010/0154570 A1 Jun. 24, 2010

Related U.S. Application Data

(60) Provisional application No. 60/651,982, filed on Feb. 14, 2005.

(51) Int. Cl.
*G01N 37/00* (2006.01)

(52) U.S. Cl. .......................................................... 250/251

(58) Field of Classification Search ................... 250/251
See application file for complete search history.

(56) References Cited

U.S. PATENT DOCUMENTS

| | | | | |
|---|---|---|---|---|
| 7,030,370 | B1 * | 4/2006 | Crookston et al. | 250/251 |
| 7,126,112 | B2 * | 10/2006 | Anderson et al. | 250/251 |
| 7,459,673 | B2 * | 12/2008 | Katori | 250/251 |
| 2004/0262210 | A1 * | 12/2004 | Westervelt et al. | 210/222 |
| 2005/0199871 | A1 * | 9/2005 | Anderson et al. | 257/14 |
| 2010/0207016 | A1 * | 8/2010 | McBride et al. | 250/251 |
| 2010/0320995 | A1 * | 12/2010 | David et al. | 324/72 |

OTHER PUBLICATIONS

Reichel, J. "Microchip traps and Bose-Einstein condensation" Appl. Phys. B 75, 469-487 (2002).*

Davis, T. Specific Heat and Residual Resistivity and Ternary Noble-Metal Alloys, Physical Review B. Volb. 6, No. 8, Oct. 1972.*

C.Henkel ,S. Potting and M. Wilkens,Appl. Phys.B69,379-387 "*Loss and heating of particles in small and noisy traps*" 1999.

C. Henkel , S. Potting Appl. Phys. B 72 ,73-80 (2001) "*Coherent transport of matter waves*".

Y. Lin, I. Teper, C. Chin, and V. Vuleti Physical Review Letters vol. 92, 020404 (2004) "*Impact of the Casimir—Polder Potential and Johnson Noise on Bose-Einstein Condensate Stability near Surfaces*".

P. Treutlein, P. Hommelhoff, T. Steimetz. T.W. Hansch , and J. Reichel, Phys Rev. Lett. 92, 203005 (2004) "*Coherence in Microchip Traps*".

(Continued)

*Primary Examiner* — David A Vanore
*Assistant Examiner* — Wyatt Stoffa
(74) *Attorney, Agent, or Firm* — Mark M Friedman

(57) ABSTRACT

An AtomChip device and a method for trapping, manipulating and measuring atoms in ultra high vacuum chamber, and for increasing the lifetime of the trapped atoms, the AtomChip device including at least one conductive element, made of metal, wherein at least part of the metal is a dilute alloy metal, and wherein the at least one conductive element has a low working temperature.

20 Claims, 7 Drawing Sheets

OTHER PUBLICATIONS

A.B. Matsko, N. Yu, and L. Maleki, Phys. Rev. A67 ,043819 (2003) "*Gravity field Measurements Using Cold Atoms with Direct Optical Readout*".
T.H. Davis,and J.A. Rayne,Phys. Rev B,6, 2931 (1972) "*Specific Heat and Residual Resistivity of Binary and Ternary Noble—Metal Alloys*".
J.S. Dugdale ,Z.S. Basinski Phy. Rev. vol. 157,552 May 15, 1967 "*Mathiessen's Rule and Anisotropic Relaxation Times*".
P.G. Huray and L.D. Roberts, Phys. Rev. B 4 2147 (1971) "*Study of the Cu-Au Alloy Systems as a Function of Composition and Order through the Use of the Mossbauer Effect for Au*".
R. Folman and J. Schmiedmayer,Nature 413,466 (2001) "*Mastering the Language of Atoms*".
H.A. Fairbank Phys Rev vol. 66 p. 274-281 Nov. 1944 "*The Electrical Resistivity of Copper-Zinc and Copper—Tin Alloys at Low Temperatures*".
J Bass, *Advan. Phys* 21,431(1972).
R. Folman P. Kruger and J. Schmiedmayer,J. Denschlag and C. Henkel , *Advances in Atomic,Molecular ,and Optical Physics*,vol. 48 p. 263-365 (2002).
J.M. Ziman *Electrons and Phonons*. Oxford University Press NY (1963).
M.P. Malkov,I.B. Danilov , A.G. Zeldovich and A.B. Fradkov. Handbook on Physical and Technical Basis of Cryogenics ,Energiya, Moskwa, (1973).

* cited by examiner

ATOMCHIP DEVICE

FIELD AND BACKGROUND OF THE INVENTION

The present invention relates to an AtomChip device and, in particular to an AtomChip device that extends the lifetime of cold neutral atoms, which it trapped in an atom microtrap, with, regard to existent AtomChip devices that include pure metal components, by use of metal alloys and at especially low working temperatures.

The AtomChip is a device aimed at realizing quantum technology devices in which the rules of quantum mechanics are used to realize applications such as ultra sensitive clocks, gravitation and acceleration sensors, quantum cryptography (secure communications), and quantum computing, to name a few.

A typical, conventional AtomChip is composed of a substrate upon which an electrically conductive functional layer is disposed. In the case that the substrate is not electrically insulating, a layer of electrically insulating material will be disposed between the substrate and the functional layer. The AtomChip's conducting element, through which an electrical current flows creating a magnetic field in case of DC electrical current or electromagnetic field in case of AC electrical current that will be referred to as internal fields, is within the functional layer, as a part of it, beneath it, or in any other suitable structure. The form of the AtomChip's conducting element determines the distribution of potentials of the internal fields, which affect the trapping performance. This form can be Z-shaped, U-shaped, conveyer belt shape or in a variety of other shapes or combinations of shapes. External bias fields are necessary in many cases.

The AtomChip device is located within an ultra high vacuum chamber. Commonly, the atom trapping on AtomChips is by means of only magnetic fields. In the more advanced AtomChip devices, atoms within the vacuum chamber are influenced by internal magnetic and electric fields, by light fields whose sources can be laser sources, some of which are reflected by the functional layer, if it has a mirror nature, and by electrical fields and magnetic fields generated by elements outside of the vacuum chamber, which will be referred to as external fields. The combination of these influences, if performed correctly, traps cold neutral atoms in very close proximity to the AtomChip in the atom microtrap.

The elements of the AtomChip and in particular the functional layer and the AtomChip's conducting element are substantially composed of pure metals.

Due to harmful effects such as magnetic thermal noises, as well as background noises, the time interval of the atom trapping is limited, the atoms escape the trap, and the cloud that they create fades with time. The intensity of the magnetic noise drastically increases with reduction of the distance between the trap center and the AtomChip surface [5], [6].

The typical lifetime of atoms trapped at the distance of 3 μm from an AtomChip surface in a conventional AtomChip device is about 0.5 seconds, the magnetic noise portion in the lifetime limitation being 80%, see for example [1].

Besides the lifetime limitation (losses), the magnetic noise and background noises increase the temperature of the trapped atoms (heating) and destroy their coherence (decoherence).

Reduction of the magnetic noise is needed for all applications of the AtomChip. For example, it is important for a quantum gravity gradiometer, where the AtomChip is used as an interferometer based gravity sensor. The sensitivity of this device is limited by the magnetic noise [7]. For an atomic clock the magnetic noise limits the frequency stability, which determines the atomic clock precision [8].

There is thus a widely recognized need for, and it would be highly advantageous to have an AtomChip device, whose magnetic noise level would be significantly less than that which can currently be achieved in existent AtomChip devices.

SUMMARY OF THE INVENTION

It is an object of the present invention to provide an AtomChip device that significantly extends the lifetime of the atom cloud trapped in close proximity to it.

The invention relates to an AtomChip device which is a device for trapping and manipulating cold neutral atoms in miniaturized magnetic traps above a substrate using either microscopic patterns of permanent magnetization in a film or microfabricated wire structures carrying current or charge. The AtomChips are designated for creating potentials where atoms are confined strongly enough to consider implementing quantum logic gate schemes. The present invention refers to the AtomChips containing microfabricated wire structures.

The AtomChip device is composed of an insulating substrate with deposited conductive elements made of dilute alloys, creating a low magnetic thermal noise atom microtrap for the atoms, when it is cooled down to low temperatures. In such an atom microtrap, the lifetime is extended, while harmful effects such as heating and decoherence are suppressed, compared with those achievable by using conventional AtomChips devices, whose metal elements are made of pure metals. In the AtomChip with the alloy-made conductive elements cooled down to 4.2 K, the lifetime achieved for a trap at a distance of 3 microns from the surface is 37.5 seconds, when the background noise is absent and all other working conditions are similar to the working conditions of AtomChip having conducting elements that are substantially composed only of pure metals.

According to the present invention there is provided an AtomChip device for trapping, manipulating and measuring atoms in ultra high vacuum chamber, and for increasing the lifetime of the trapped atoms, the AtomChip device including: (a) at least one conductive element, having a flat surface, wherein the at least one conductive element is made of metal, wherein at least part of the metal is a dilute alloy, and wherein the at least one conductive element has a working temperature.

According to further features in preferred embodiments of the invention, the increasing of the lifetime of the trapped atoms compared with the lifetime achievable by using AtomChip device having conductive elements made of pure metals is at least larger by a factor of (300 K/working temperature)× (alloy resistivity at working temperature/metal resistivity at 300 K), the AtomChip device further including: (b) a functional layer, having a flat surface, wherein the functional layer is made of metal, wherein at least part of the metal is made of a dilute alloy, and wherein the functional layer is isolated electrically from the conductive element.

According to further features in preferred embodiments of the invention, the AtomChip device further including: (c) a substrate, wherein the substrate gives mechanical strength to the AtomChip device; and, (d) an insulated layer, disposed on the substrate, wherein the insulated layer electrically insulates the at least one conductive element from the functional layer.

According to further features in preferred embodiments of the invention, the at least one conductive element's flat surface and the functional layer's flat surface are substantially on the same plane.

According to further features in preferred embodiments of the invention, the at least one conductive elements flat surface and the functional layer's flat surface are substantially on different planes.

According to further features in preferred embodiments of the invention, the AtomChip device further including: (e) at least two conductive elements, having flat surfaces.

According to further features in preferred embodiments of the invention, the conductive element, and the functional layer, are both substantially made of the same dilute alloy.

According to further features in preferred embodiments of the invention, the at least one conductive element's working temperature is less than room temperature.

According to further features in preferred embodiments of the invention, the at least one conductive element has a geometric shape selected from a group consisting of a straight line, Z-shape, conveyer belt shape, or U-shape.

According to further features in preferred embodiments of the invention, the at least one conductive element has a geometric Z-shape.

According to further features in preferred embodiments of the invention, the at least one conductive element has a geometric U-shape.

According to further features in preferred embodiments of the invention, the at least one conductive element has a geometric conveyer belt shape.

According to further features in preferred embodiments of the invention, the at least one conductive element is made of dilute alloy metal that has, at the working temperature, lower resistivity and temperature/resistivity ratio values than both resistivity and temperature/resistivity ratio values of gold at room temperature.

According to further features in preferred embodiments of the invention, the at least one conductive element's dilute alloy metal is made of Ag plus x atomic percent of Au, wherein x is at least 1 and at most 5.5 for the working temperature of 77 K, wherein x is at least 0.35 and at most 6 for the working temperature of 20 K, and wherein x is at least 0.1 and at most 6 for the working temperature of 4.2 K.

According to further features in preferred embodiments of the invention, the at least one conductive element's dilute alloy metal is made of Au plus x atomic percent of Ag, wherein x is at least 0.5 and at most 5 for the working temperature of 77 K, wherein x is at least 0.32 and at most 6 for the working temperature of 20 K, and wherein x is at least 0.08 and at most 6 for the working temperature of 4.2 K.

According to another preferred embodiments of the invention, an AtomChip device for trapping, manipulating and measuring atoms in ultra high vacuum chamber, and for increasing the lifetime of the trapped atoms, the AtomChip device including: (a) at least one conductive element, having a flat surface, wherein the at least one conductive element is made of metal, wherein at least part of the metal is a dilute alloy metal, and wherein the at least one conductive element has a working temperature, wherein the at least one conductive element working temperature is less than room temperature, wherein the at least one conductive element has a geometric shape selected from a group consisting of a straight line, Z-shape, conveyer belt shape, or U-shape, and wherein the at least one conductive element's is made of an dilute alloy having both resistivity and temperature/resistivity ratio values at the working temperature lower than both resistivity and temperature/resistivity ratio values of gold at room temperature; (b) a functional layer, having a flat surface, wherein the functional layer is made of metal, wherein at least part of the metal is a dilute alloy metal, and wherein the functional layer is electrically isolated from the conductive element; (c) a substrate, wherein the substrate gives mechanical strength to the AtomChip device; and (d) an insulated layer, disposed on the substrate, wherein the insulated layer electrically insulates the at least one conductive element from the functional layer.

According to further features in preferred embodiments of the invention, the at least one conductive element's dilute alloy metal is made of Ag plus x atomic percent of Au, wherein x is at least 1 and at most 5.5 for the working temperature of 77 K, wherein x is at least 0.35 and at most 6 for the working temperature of 20 K, and wherein x is at least 0.1 and at most 6 for the working temperature of 4.2 K.

According to further features in preferred embodiments of the invention, the at least one conductive elements dilute alloy metal is made of Au plus x atomic percent of Ag, wherein x is at least 0.5 and at most 5 for the working temperature of 77 K, wherein x is at least 0.32 and at most 6 for the working temperature of 20 K, and wherein x is at least 0.08 and at most 6 for the working temperature of 4.2 K.

According to the present invention there is provided a method of trapping, manipulating and measuring atoms including the steps of (a) providing an AtomChip device including: (i) at least one conductive element, having a flat surface, wherein the at least one conductive element is made of metal, wherein at least part of the metal is a dilute alloy metal, wherein the at least one conductive element has a working temperature, wherein the at least one conductive element working temperature is less than room temperature, wherein the at least one conductive element has a geometric shape selected from a group consisting of a straight line, Z-shape, conveyer belt shape, or U-shape, and wherein the at least one conductive element's dilute alloy metal is made of an alloy having both resistivity and temperature/resistivity ratio values at temperature lower than both resistivity and temperature/resistivity ratio values of gold at room temperature; (ii) a functional layer, having a flat surface, wherein the functional layer is made of metal, wherein at least part of the metal is a diluted alloy metal, and wherein the functional layer is electrically isolated from the conductive element; (iii) a substrate, wherein the substrate gives mechanical strength to the AtomChip device; and (iv) an insulated layer, disposed on the substrate, wherein the insulated layer electrically insulates the at least one conductive element from the functional layer; (b) installing the AtomChip device inside a chamber, at room temperature and at room pressure, wherein the chamber has the structure of an ultra high vacuum chamber, (c) closing and sealing the chamber, (d) lowering the pressure inside the chamber; (e) lowering the temperature of the at least one conductive element; (f) supplying atoms to the inside of the chamber; and (g) connecting the at least one conductive clement to an electricity source.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
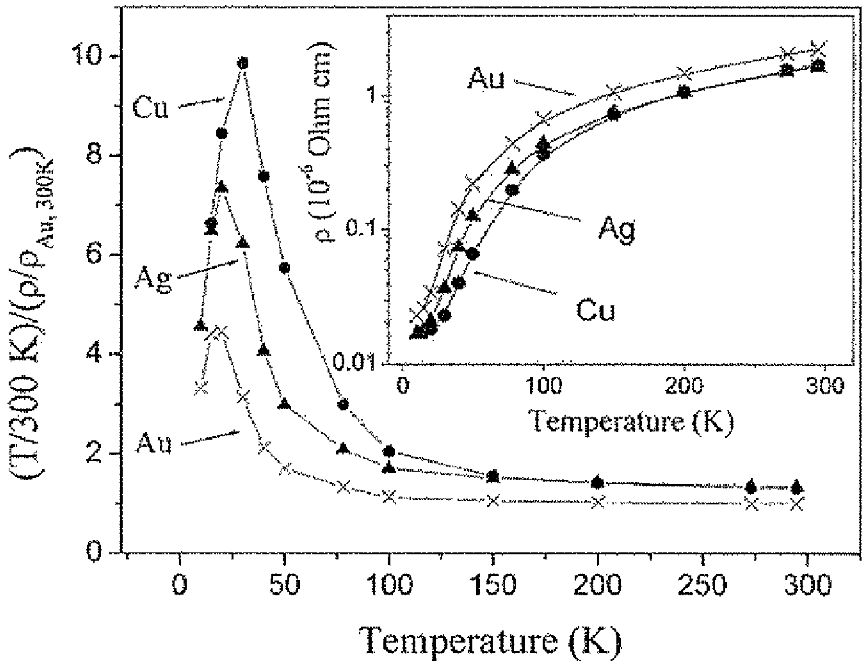
FIG. 1 is a graph illustrating the temperature dependence of the normalized ratio T/ρ calculated for wires made of copper, silver, and gold.

The present invention is an AtomChip device, and in particular an AtomChip device with alloy-made conductive elements working at a low temperature and extending the lifetime of the trapped atoms.

The principles and operation of an AtomChip device according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings.

Unless otherwise defined, all technical and scientific terms used herein have the same meaning as commonly understood by one of ordinary skill in the art to which this invention belongs. The materials, dimensions, methods, and examples provided herein are illustrative only and are not intended to be limiting.

The present invention may be better understood with reference to the following scientific papers:

[1] Y. Lin, I. Teper, C. Chin, and V. Vuleti'e. *Physical Review Letters* Vol. 92, 020404 (2004);

[2] R. Folman, P. Kruger and J. Schmiedmayer, J. Denschlag and C. Henkel, *Advances in Atomic, Molecular, and Optical Physics*, Vol. 48, P. 263-365, (2002);

[3] R. Folman and J. Schmiedmayer, *Nature* 413, 466 (2001);

[4] P. Kruger Ph.D. thesis, Heidelberg (2004);

[5] C. Henkel, S. Pötting, and M. Wilkens, *Appl. Phys.* B 69, 379 (1999);

[6] C. Henkel, S. Pötting, *Appl. Phys.* B 72, 73-80(2001);

[7] A. B. Matsko, N. Yu, and L. Maleki, *Phys. Rev. A* 67, 043819 (2003);

[8] P. Treutlein, P. Hommelhoff, T. Steinmetz, T. W. Hansch, and J. Reichel, *Phys. Rev. Lett.* 92, 203005 (2004);

[9] J. M. Ziman *Electrons and Phonons*. Oxford University Press New York (1963);

[10] M. P. Malkov, L. B. Danilov, A. G. Zeldovich, and A. B. Fradkov. *Handbook on Physical and Technical Basis of Cryogenics*, Energiya, Moskwa, (1973);

[11] H. A. Fairbank *Phys. Rev.* Vol. 66, P. 274-281 November (1944);

[12] J. S. Dugdale, Z. S. Basinski *Phy. Rev.* Volume 157, 552 15 May (1967);

[13] T. H. Davis, and J. A. Rayne, *Phys. Rev.* B, 6, 2931 (1972);

[14] P. G. Huray and L. D. Roberts, *Phys. Rev.* B 4 2147 (1971); and

[15] J. Bass, *Advan. Phys.* 21, 431 (1972).

Which are incorporated by reference for all purposes as if fully set forth herein.

As used herein the specification and in the claims section that follows, the terms: AtomChip, magnetic atom microtrap, atom microtrap, AtomChip conducting element, loss rate, lifetime, decoherence, heating, magnetic thermal noise, background noise, technical noise, and dilute alloy are as specified in the following list:

The term "AtomChip" and the like substantially refer to a device for trapping and manipulating cold neutral atoms in atom microtraps above a substrate in ultra high vacuum.

The term "atom microtrap" and the like substantially refer to at least two types of trapping potentials such as magnetic, electric, and light, which result from the superposition of the magnetic, electric, and light fields near an AtomChip.

The term "magnetic atom microtrap" and the like substantially refer to a trapping magnetic potential, which results from the superposition of magnetic fields near an AtomChip. The source of the magnetic fields is a microfabricated wire structure carrying currents.

The terra "AtomChip conducting element" and the like substantially refer to a wire of an AtomChip carrying the electrical currents whose magnetic field creates at least part of a Magnetic atom microtrap, and in case of an atom microtrap whose magnetic and electric fields create at least part of the atom micro trap.

The term "loss rate" and the like substantially refer to the rate of the atom quantity decreasing in the atom micro trap.

The term "lifetime" and the like substantially refer to the inverse of the loss rate, describing the time at which the number of trapped atoms has decreased to 1/e of the initial number.

The term "decoherence" and the like substantially refer to the rate of the phase coherence loss of the atoms in the atom microtrap. This means that the coherence of quantum states of the atoms, which is needed for the implementation of quantum technology, is lost.

The term "heating" and the like substantially refer to the rate of the temperature rise of the trapped atoms.

The term "magnetic thermal noise" and the like substantially refer to the harmful electromagnetic radiation in the microtrap produced by the conductive elements of the AtomChip.

The term "technical noise" and the like substantially refer to the magnetic noise level due to the instability of the electrical currents in the conductive elements of the AtomChip (due to imperfections in the current sources) and resulting in magnetic potential instability in the atom microtrap.

The term "background noise" middle like substantially refer to equivalent noise, which is contributed by all noise sources reducing the atom lifetime except the thermal magnetic noise. For example, the "background noise" includes, besides the technical noise, harmful electromagnetic background and equivalent noise effect due to scattering of trapped cold atoms with residual gas in the ultra high vacuum chamber.

The term "dilute alloy" and the like substantially refer to an alloy in which the solute concentration is small and the solute atom locations in the host metal structure are random.

The symbols used in the formulae in this patent application signify terms as shown in the following list:

$\tau$ lifetime, the typical time after which the number of trapped atoms is reduced to 1/e of the initial number (at time t=0).

$\Gamma_{0\rightarrow f}$ loss rate, the number of atoms lost from the trap (going from a initial trapped state 0 to a final un-trapped state f), per unit time ($\Gamma=1/\tau$).

r=r(x,y,z) the magnitude of the vector $\vec{r}$ pointing at a position in space.

r'=r(x',y',z') the vector pointing a position of the source of magnetic thermal noise in the wire.

x, y, z orthogonal components of the vector $\vec{r}$.

$\mu$ the atomic magnetic moment of the atoms.

$\mu_i,\mu_j$ the projections of the atomic magnetic moment on the main axes (i,j=1,2,3).

$\mu_B$ Bohr's magneton ($9.27400899\cdot10^{-24}$ Joule/Tesla).

µm micro-meter ($10^{-6}$ meters).

$\hbar$ reduced Planck's constant ($\hbar$=h/(2$\pi$; h=$6.626\cdot10^{-34}$ Joule·second).

$\omega$ frequency.

$\omega_{f0}$ the transition frequency between states 0 and f—For spin-flip transitions $\omega_{f0}$ is the Larmor frequency ( $$\omega_L = \frac{\mu B}{\hbar},$$

where B is the magnitude of the magnetic field) of the atomic spin in the center of the trap.

$S_B^{ij}(\omega_{f0})$ the spectral density of the magnetic thermal noise at the transition frequency $\omega_{f0}$.

$\delta(\omega)$ the penetration depth of the electromagnetic field into conductive element (skin depth).

$$\delta(\omega) = \sqrt{\frac{2\rho}{\mu_0\omega}},$$

where $\mu_0$ is the vacuum permeability ($\mu_0=4\pi\cdot10^{-7}$ N/A$^2$).

$k_B$ Boltzmann's constant ($1.38\cdot10^{-23}$ Joule/Kelvin).

T absolute temperature of the conductive element.

$\rho$ the resistivity of the conductive element.

$\rho_{Au\ 300}$ the resistivity of gold (Au) at room temperature.

$\pi$ an irrational number, approximately 3.141592654. (The circumference of a circle is 2$\pi$R where R is the radius).

tr trace of a tensor (sum of its eigenvalues).

$d^ix$ differential spatial element of dimension i (i=1,2,3.)

$Y_{ij}$, $X_{ij}$ geometrical tensors.

I electrical current

K absolute temperature scale units (Kelvins).

The following list is a legend of the numbering of the application illustrations:

101 AtomChip device.

102 atom microtrap.

11 AtomChip functional layer.

**11*a*** functional layer's surface.

12 AtomChip conductive element

**12*a*** AtomChip conductive element's surface.

13 insulated grooves.

14 cold neutral atoms.

15 AtomChip's first insulated layer.

16 AtomChip substrate.

**16*a*** etched groove in the AtomChip substrate.

17 homogeneous external magnetic field.

18 AtomChip's second insulated layer.

19 electric wires.

20 ultra high vacuum chamber's wall.

AtomChip devices are used for the trapping and manipulating of cold neutral atoms. Detailed reference to AtomChip devices and their various applications is given, for example, in the reviews [2] and [3]. The quality of the AtomChip devices is limited by three major characteristic rates: loss rate, heating rate, and decoherence rate, and their dependence on the distance of the atoms to the AtomChip devices surface—'trap height' (below, in the noise calculation following equation (3), the 'trap height' is referred as the shortest distance from the surface of the conductive element of the AtomChip up to the center of the trap).

In particular, the lifetime of the cold atoms in the atom microtrap, which is defined as a reciprocal loss rate, varies depending on superposition of magnetic noise and background noise. The latter includes many factors such as scattering of the atoms by residual gas in the vacuum chamber, in which the AtomChip device is disposed, technical noise due to current instability in the atom microtrap wires or other electronic devices and harmful electromagnetic background radiation in the atom microtrap. The lifetime limitations related to the residual gas scattering as well as current supply instability in the AtomChip devices presently in use, are in the range of 20-30 seconds [4]. In close proximity to the AtomChip device's surface, the main limitation of the lifetime is due to the thermally activated magnetic thermal noise originating in the conductive elements of the AtomChip device. For the AtomChip device, described in [1], the effect of the magnetic thermal noise limits the lifetime to $\tau$~1 second for a 'trap height' equal to 5 µm The present invention specifically addresses the reduction of the magnetic thermal noise, and therein increasing the lifetime of the cold atoms trapped near the AtomChip device's surface. The reduction of the magnetic noise is expected also to result in decreased harmful decoherence and heating rates, see, for example [2].

According to [5], the expression for the loss rate ($\Gamma$) limiting the lifetime ($\Gamma=1/\tau$) is given as (heating and decoherence follow similar rates):

$$\Gamma_{0\rightarrow f}(r) = \sum_{ij} \frac{\langle 0|\mu_i|f\rangle\langle f|\mu_f|0\rangle}{\hbar^2} S_B^{if}(\omega_{f0}) \quad (1)$$

where $\mu_i$ and $\mu_j$ (i,j=1,2,3) are the projections of the atomic magnetic moment on the main axes and $S^{ij}_B(\omega_{f0})$ is the spectral density of the magnetic thermal noise at the transition frequency $\omega_{f0}$ (for spin-flip transitions $\omega_{f0}$ is the Larmor frequency of the atomic spin in the center of the trap).

In the stationary limit, i.e., for very low transition frequencies, such that the penetration depth $\delta(\omega)$ of the electromagnetic field into the conductive element is much larger than its thickness, and the wavelength of the radiated field is much larger than the dimensions of the system, the spectral density of the magnetic thermal noise is described by a simple product of a factor, which is material-dependent and a geometrical tensor $Y_{ij}$ [6]:

$$S_B^{ij} = \frac{\mu_0^2 k_B T}{4\pi^2 \rho} \cdot Y_{ij} \tag{2}$$

where $k_B$ is Boltzmann's constant, $\mu_0$ is the vacuum permeability, ρ the resistivity of the conductive element, and T is the temperature of the conductive element. Under the above assumption, the spectral density of the magnetic thermal noise in Eq. (2) is independent of the transition frequency and gives rise to a scattering rate which is proportional to the ratio T/ρ. The geometrical tensor $Y_{ij}$ at a specific point x, which is taken to be the center of the trap, is given by:

$$Y_{ij} = \delta_{ij} tr(X_{ij}) - X_{ij} \tag{3}$$

$$X_{ij}(x) = \frac{1}{2}\int_V d^3x' \frac{(x-x')_i (x-x')_j}{|x-x'|^3 |x-x'|^3}$$

where the integration is done over the volume of the conductive element.

Conventionally, an AtomChip device's conductive elements are made of pure metals such as copper, silver, or gold. Taking gold at room temperature as our standard, we may write a simplified expression for Γ equivalent to [6]:

$$\Gamma \approx 57 s^{-1} \frac{(\mu/\mu_B)^2 (T/300\text{ K})}{\rho/\rho_{Au,300}} (Y_{ij} \times 1\ \mu\text{m}) \tag{4}$$

where $\mu_B$ is the Bohr magician and $\rho_{Au,300}$ is the resistivity of gold at room temperature. Similar expressions were obtained for heating and decoherence [2].

In this patent application we will show that cooling of the conductive elements fabricated of pure metals down to liquid helium temperature cannot significantly reduce the ratio T/ρ, and therefore is not an effective way to suppress harmful effects such as loss rate, healing, and decoherence, on the trapped atoms near the surface of the AtomChip device. On the contrary, using dilute alloys in the conductive elements of the AtomChip device gives the desired result.

The effectiveness of cooling the conductive elements as a way of decreasing loss rate (i.e. increasing lifetime), heating, and decoherence, directly follows from the fact that these are determined by the temperature dependence of the resistivity of the material of choice in the AtomChip conductive element. According to the Mattheissen rule, the metal resistivity may be expressed as a sum $\rho=\rho_0+\rho(T)$ where $\rho_0$ is the temperature independent residual resistivity due to crystal defects and impurities, and ρ(T) is the temperature dependent part, which is determined for nonmagnetic metals by phonon scattering, by electron-electron scattering, as well as Umklapp (interband) processes [9].

For the metals frequently used to fabricate the current-carrying conductive element of the AtomChip and which give rise to the magnetic fields creating microtraps, e.g. gold, silver, and copper, the main contribution to ρ(T) is given by the phonon scattering.

Referring now to the drawings, FIG. 1 is a graph illustrating the temperature dependence of the normalized ratio T/ρ calculated for wires made of copper (a curve with circles), silver (a curve with triangles), and gold (a curve with crosses) is shown. The data are normalized to the ratio value for gold at T=300 K. In the inset: temperature dependence of the resistivity of the metals. As is shown in the inset resistivity behavior of the metals (inset) is close to linear in the temperature region 100 K<T<300 K and rapidly drops at lower temperatures. The resistivity data for the FIG. 1 were extracted from [10], and the residual resistivity was taken to be 1% of the room temperature resistivity. Consistently, the ratio T/ρ (T) has a broad peak reflecting the lifetime reduction in the range T<100 K. The present invention consists of using dilute alloys as a material for AtomChip conductive elements. For the dilute alloys the Mattheissen rule is modified to $\rho=\rho_0(x)+\rho(T)$, where x is the solute concentration, $\rho_0(x)$ linearly depends on x and ρ(T) is the phonon resistivity of the solvent almost not dependent on x (see for example, [11] and [12]).

Figure 2:
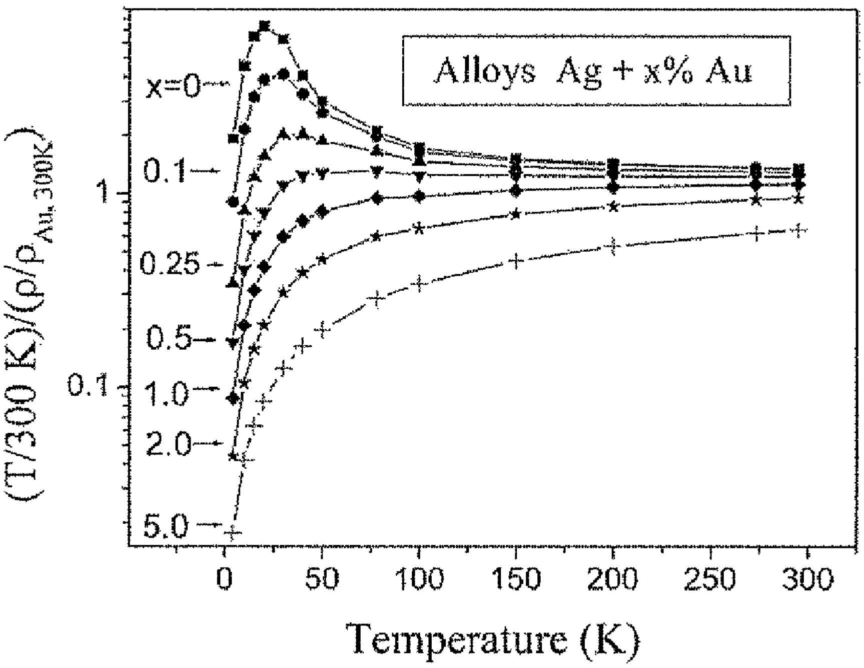
FIG. 2 is a graph illustrating the temperature dependence of the ratio T/ρ (normalized to the respective parameter value for gold at 300 K) for silver and its alloys with gold.

FIG. 2 is graph illustrating the temperature dependence of the ratio T/ρ (normalized to the respective parameter value for gold at 300 K) for silver and its alloys with gold, pure silver (a curve with squares), 0.1% gold (a curve with circles), 0.25% gold (a curve with triangles), 0.5% gold (a curve with inverted triangles) 1% gold (a curve with diamonds), 2% gold (a curve with stars), and 5% gold (a curve with crosses) is shows, The ρ(T) dependence for alloys were calculated using the residual resistivity data given by [12] and [13]. FIG. 2 shows the transformation, for increasing x, of the ratio T/ρ(T) as function of temperature for the dilute alloys Ag—Au. The T/ρ(T) values (calculated by using the resistivity data extracted from [12] and [13]) are normalized to the respective value for gold at T=300 K. As follows from FIG. 2, the magnetic thermal noise may be significantly reduced by replacing pure metals with dilute alloys. This effect is most notable in the low temperature regime. It should be noted that the numbers used in this part and in the figures are just examples and should not limit the application in any way. At the same time, we cannot increase the x value arbitrarily. There are two reasons limiting the solute concentration:

(i) one should avoid the ordering effects in the alloys that could result in in-homogeneity of the AtomChip's conductive element (these effects begin at about x=15-20%) see, for example, [14]. The Ag—Au alloys have a slight tendency to the ordering [13], [14]. Therefore the Ag—Au system is a good material for fabrication of the AtomChip conducting elements.

(ii) it is undesirable that the alloy resistivity at a given low temperature would be more than the resistivity of a pure metal (say, gold) at T=300 K, because the Joule heating of a highly resistive wire may hamper the effective wire cooling.

Figure 3:
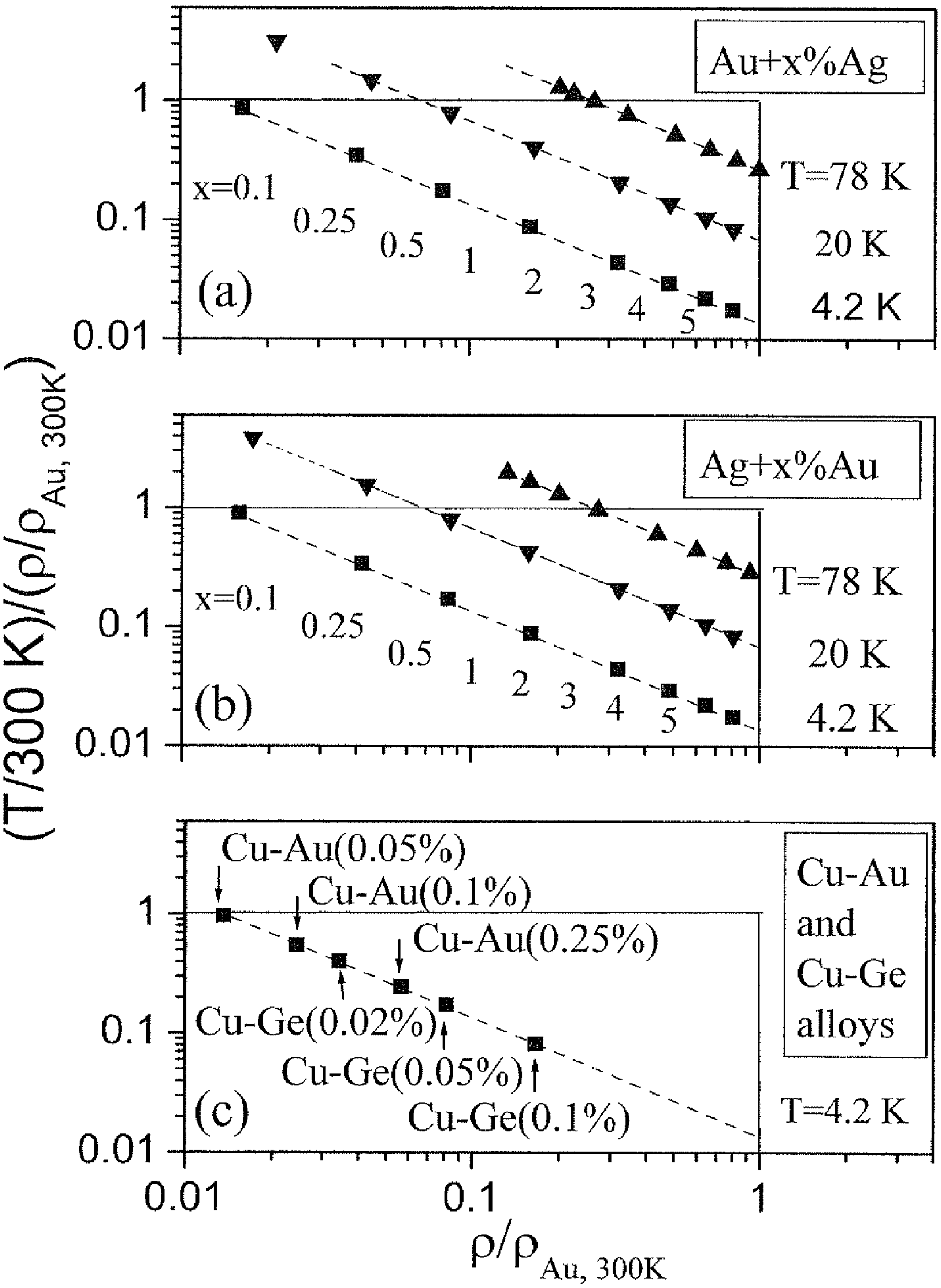
FIG. 3 is a graph illustrating the normalized (T/ρ) vs the normalized resistivity plot for dilute alloys.

FIG. 3 is a graph illustrating the normalized (T/ρ) vs the normalized resistivity plot for dilate alloys. The T/ρ and resistivity values are normalized to those of Au at 300 K. (a) Au—Ag (b) Ag—Au alloys, (c) Cu (copper)-Au and Cu—Ge (germanium) alloys. For (c) the solute concentration is given in brackets. The residual resistivity data for alloys are extracted from [12] and [13] for Au—Ag and Ag—Au alloys and from [11] for Cu—Au and Cu—Ge alloys. Plotting of the ratio T/ρ(T) as a function of the resistivity in a double logarithmic scale enables to determine the convenient solute concentrations. In FIG. 3 the ratio T/ρ(T) vs ρ(T) is presented at T=77K, T=20 K, and T=4.2 K, for the dilute alloys Au+xAg (a). The alloys with Ag concentrations 0.5% <x<5% for T=77 K, 0.32%<x<6% for T=20 K and 0.08%<x<6% for T=4.2 K give rise to smaller magnetic thermal noise and lower resistivity than those for gold at room temperature. Analogous results are achieved for the dilute Ag+xAu alloys (b) in the regions 1%<x<5.5% for T=77 K, 0.35%<x<6% for T=20 K, and 0.1%<x<6% for T=4.2 K. The criteria for superior characteristics for quantum technology are therefore determined by the area bound by the solid lines $(T/300\text{ K})/(\rho(T)/\rho_{Au,300K})=1$ and $\rho(T)/\rho_{Au,300K}=1$ (the optimization area). Materials, which lie within these boundaries, are superior in both magnetic thermal noise and resistivity. It can be seen from (b) that when the resistivity of the Ag—Au alloys is equal to $\rho_{Au,300K}$ (x=5% at T=77 K, x=6% at T=20 K, and x=6% at T=4.2 K), the magnetic thermal noise reduction will be by a factor of 0.258, 0.067, and 0.014 respectively. We note that our way may be applied to numerous other alloys. For example, in (c) we show the same effect for the alloys Cu—Au and Cu—Ge. The solute concentrations on the boundary $\rho(T)/\rho_{Au,300K}=1$ for T=4.2 K are estimated as 4.5% and 0.52% respectively (the values were obtained by linear extrapolation of the $\rho_0(x)$ dependencies presented in [11] and in [12]).

Figure 4:
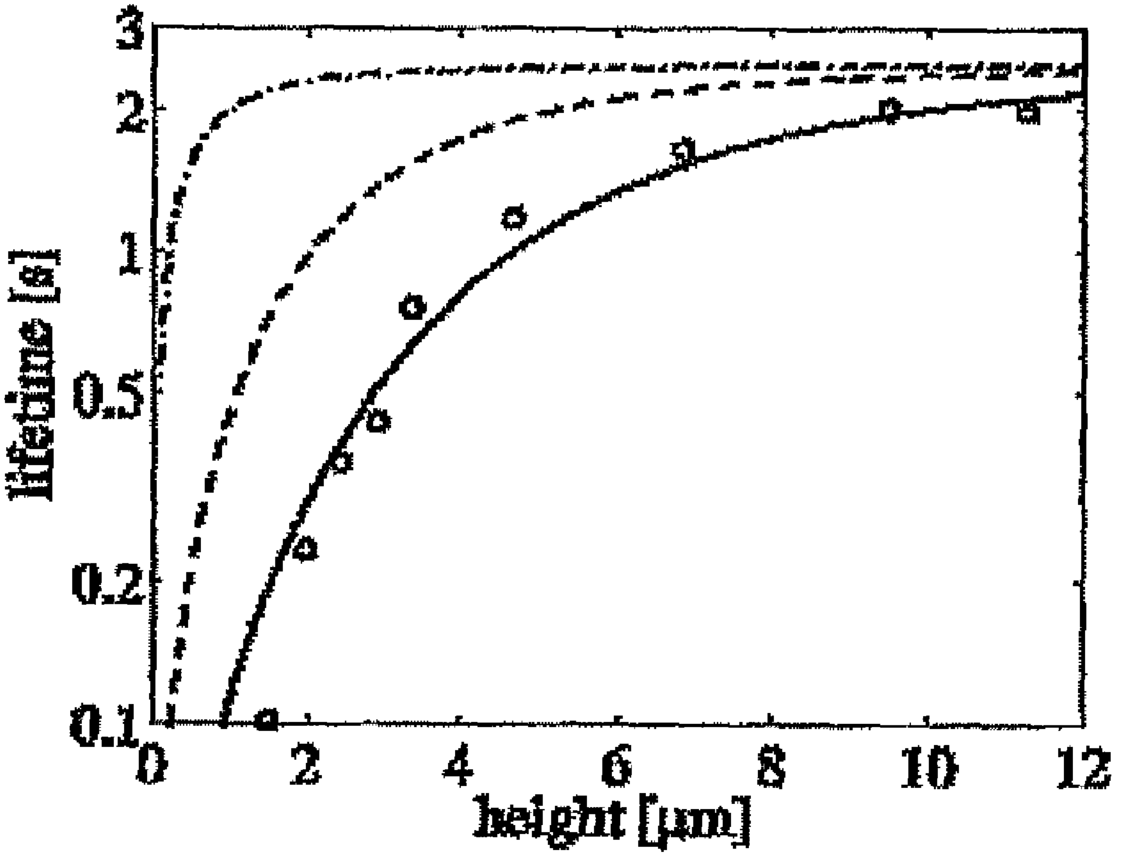
FIG. 4 is a graph illustrating a comparison of the trapping lifetimes of $^{87}$Rb atoms over copper and Ag—Au alloy wires in an atom microtrap.

The present invention is not restricted by the alloys shown in FIG. 3. Each dilute alloy (not only binary) with various components for which resistivity is dominated by the temperature independent residual resistivity and is less than the one for gold at T=300 K, meets our criteria and may be used as a material for the AtomChip conductive elements. For the correct prediction of the alloy resistivity and magnetic thermal noise level for each temperature one needs to verify that the Mattheissen rule is valid for the alloy. The review of possible deviations from the Mattheissen rule in alloys is presented in [15]. Last, the alloys based on noble metals are preferable in view of their resistance to corrosion. FIG. 4 shows a comparison of the trapping lifetimes of $^{87}$Rb atoms over a Cu wire (an AtomChip conductive element) in an atom microtrap measured by [1] (circles) with a theoretical calculation for T=400 K (solid line). Predicted lifetimes are shown for the rectangular wire of thickness 2.25 μm thick and 10 μm on wide, similar to the Cu wire used in [1], but made of an alloy of Ag with 5.5% Au content and cooled down to T=77 K (dashed) and 4.2 K (dash-dotted). FIG. 4 illustrates the effectiveness of the alloy-made wire (the AtomChip conductive element) relative to pure metals for typical working conditions in a matter wave (meaning ultra cold atoms) quantum technology setup (e.g. [1]). In this experiment the lifetime of the $^{87}$Rb atoms trapped near an AtomChip device's surface in an atom microtrap created by currents in a thin copper rectangular wire and external homogeneous magnetic fields (bias fields), was measured as a function of the 'trap height'. In the figure, the experimental points obtained by [1], are indicated by circles. Our calculation of the lifetime for pure copper-made wires, heated up to 400 K (the temperature estimated in [1]), is indicated by the solid line. Our calculations for the wires of the same geometry made of Ag+5.5% Au and cooled down to 77 K and 4.2 K, are indicated by dashed and dot-dashed lines respectively. The calculations were made using equations (2) and (3) without fitting parameters.

Fabrication of conductive elements on the chip surface with dilute alloys and cooling the elements down to working temperature T lower than room temperature] can reduce the magnetic thermal noise proportionally to the ratio T/300 K, thereby improving the required characteristics for quantum technology such as the lifetime of the atoms in their atom microtrap. Respective reduction of other harmful effects such as excitation of the vibrational degrees of freedom (heating) and phase decoherence of the trapped neutral atoms will also occur as these effects are also linearly dependent on $T/\rho(T)$ (see, for example the review [2]).

Aside from their main advantage described above, an important advantage of the AtomChip conductive clement made of alloys as compared to those of pure metals (used today) is the possibility to change the relation between magnetic thermal noise and resistivity very smoothly, by the respective choice of the solute concentration. It may be useful in practice, because in a real situation the magnetic thermal noise level is restricted by background noise (mainly by technical noise due to the fluctuations in the supplied electric current). Knowing the background noise level we can choose the alloy composition so that the magnetic thermal noise level will be just below that of the background noise, enabling us to also minimize the Ohmic resistivity and achieve a significant reduction of the Joule heating as well.

Another important advantage of the alloy-made AtomChip conductive element is that their resistivity is less sensitive to temperature fluctuations, since it is mainly due to the residual resistivity. This fact may contribute to current stability under temperature variations in space (along the AtomChip conductive element) or time.

Figure 5A:
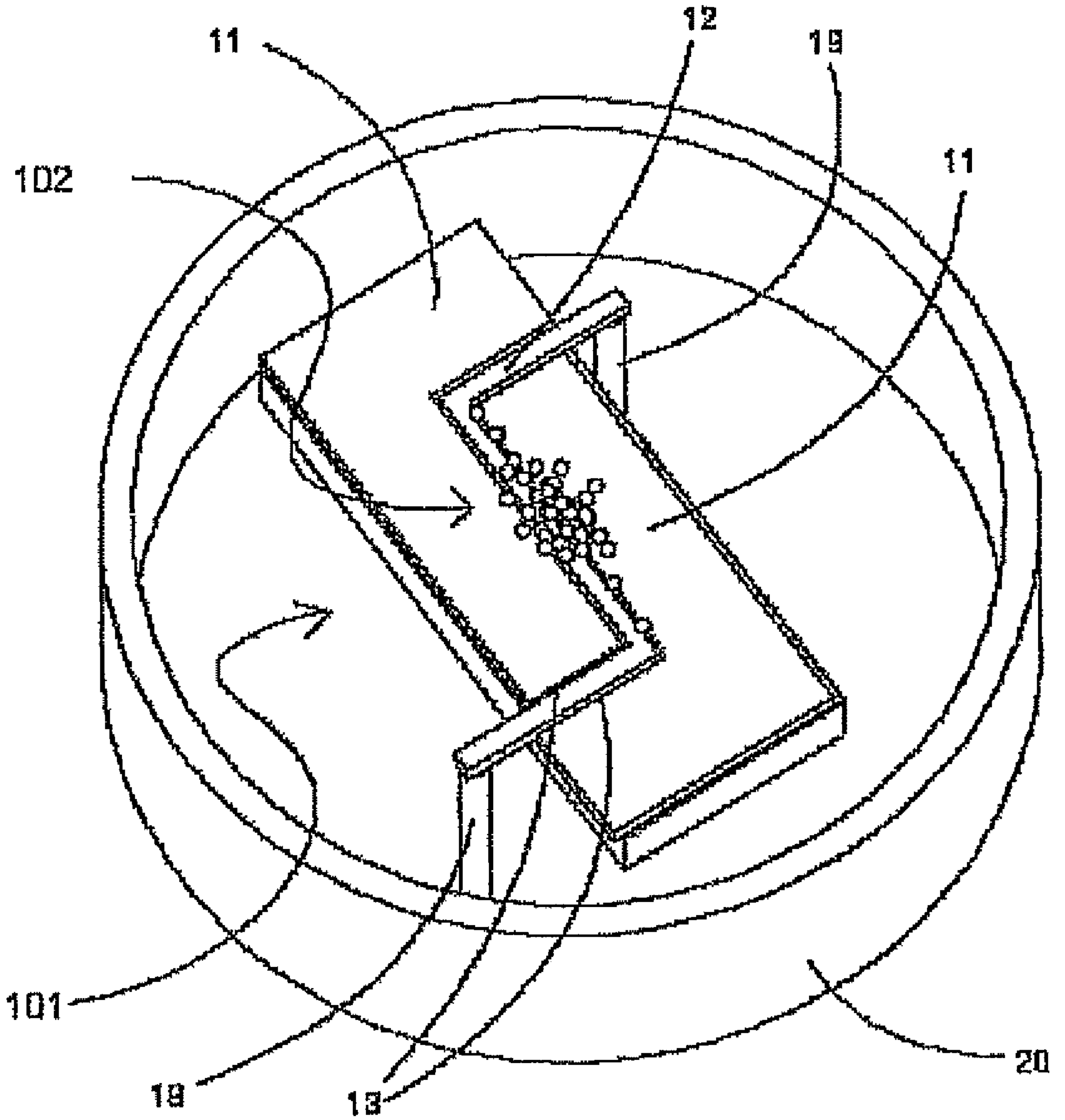
FIG. 5*a* is a schematic illustration of a preferred embodiment of an AtomChip device within a vacuum chamber of the present invention.

FIG. 5*a* is a schematic illustration of a preferred embodiment of an AtomChip device 101 within an ultra high vacuum chamber of the present invention. The illustration shows ultra high vacuum chamber's wall 20 in which AtomChip device 101 and atom microtrap 102 are located. The AtomChip device 101 includes the AtomChip functional layer 11 and AtomChip conductive element 12, whose upper surfaces (the side facing the atom microtrap 102) are on one plane and are separated from each other by insulated grooves 13. The AtomChip conductive element 12 is connected to electric wires 19 for electric feed. The AtomChip functional layer 11 and the AtomChip conductive element 12 through which an electrical current flows (creating a magnetic field in case of DC electrical current or electromagnetic field in case of AC electrical current), both take part in generating the magnetic and electric fields and in directing light for atom trapping. At least part of the material composing them is a dilute metal alloy. When trapping and holding the atoms, the temperature of AtomChip functional layer 11 and the AtomChip conductive element 12 is lower than room temperature and can be as low as very few K.

Figure 5B:
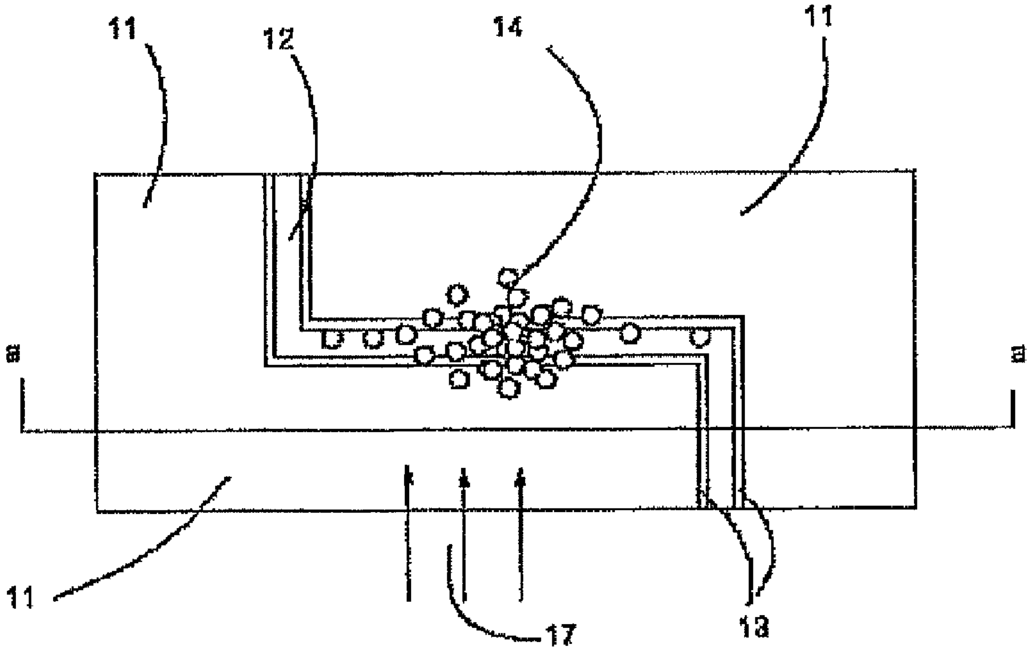
FIG. 5*b* is a schematic illustration of a preferred embodiment of an AtomChip device of the present invention of a top view.

FIG. 5*b* is a schematic illustration of a preferred embodiment of an AtomChip device 101 of the present invention. This illustration shows a top view of a homogeneous external magnetic field, whose source can be outside of the ultra high vacuum chamber, and which also takes part in generating the magnetic fields for trapping atoms, as well, as in cold neutral atoms 14 which are trapped over the AtomChip functional layer 11, the AtomChip conductive element 12, and the insulated grooves 13.

Figure 5C:
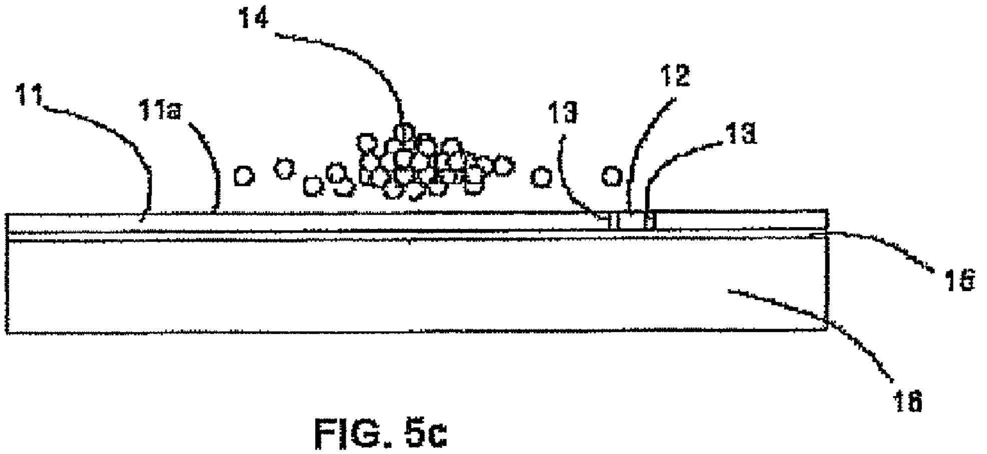
FIG. 5*c* is a schematic illustration of a side view of a preferred embodiment of an AtomChip device of the present invention.

FIG. 5*c* is a schematic illustration of a preferred embodiment of an AtomChip device 101 of the present invention. This illustration shows a side view of cold neutral atoms 14 above and in very close proximity to the plane on which the functional layer's surface 11*a* is located. The illustration also shows the AtomChip substrate 16 and first insulated layer 15 electrically insulating the AtomChip functional layer 11 and the AtomChip conductive element 12 from the AtomChip substrate 16, which provides mechanical strength to AtomChip device 101 and the AtomChip conductive element 12.

Figure 5D:
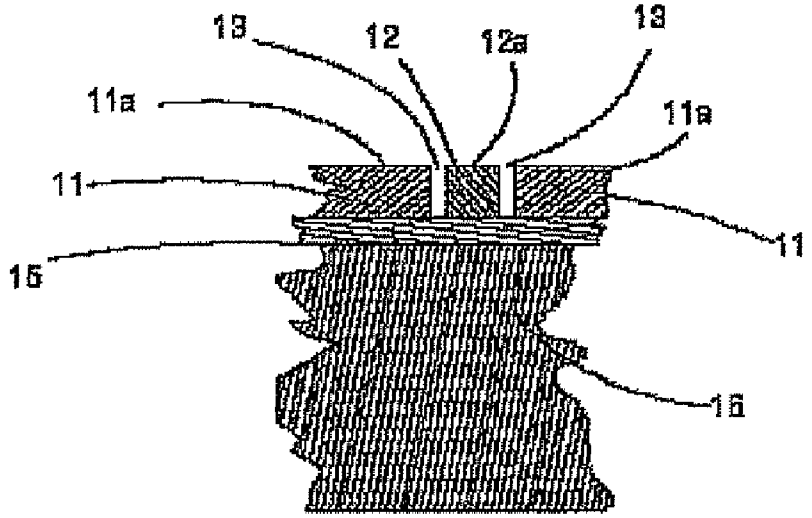
FIG. 5*d* is a schematic illustration of a detailed view of a preferred embodiment of an AtomChip device of the present invention in a-a cross section.

FIG. 5*d* is a schematic illustration of a detail of a preferred embodiment of an AtomChip device 101 of the present invention in cross section a-a, and also shows the AtomChip conductive element's surface 12*a* which is substantially on the same plane as the functional layer's surface 11*a*.

Figure 5E:
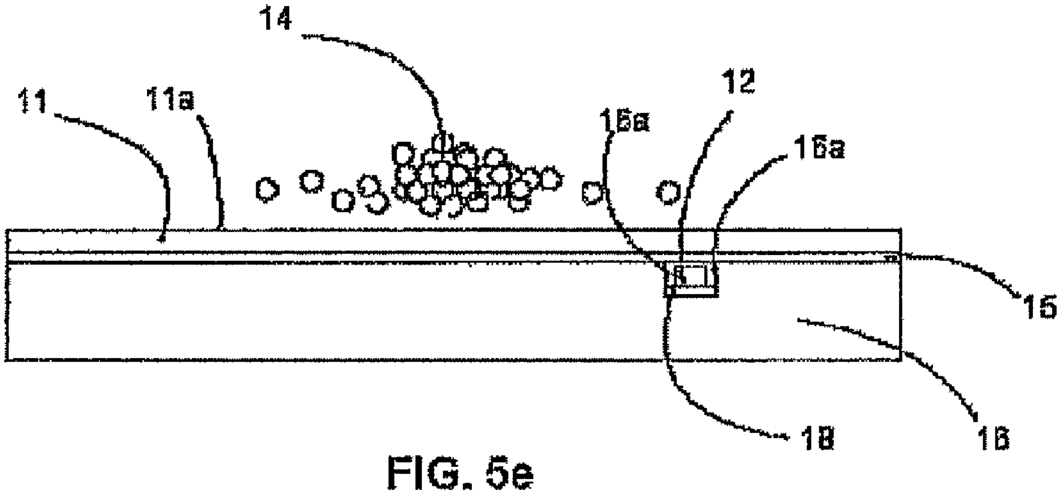
FIG. 5*e* is a schematic illustration of a side view of an additional preferred embodiment of an AtomChip device of the present invention.

FIG. 5*e* is a schematic illustration of a side view of an additional preferred embodiment of an AtomChip device 101 of the present invention. In this configuration the AtomChip functional layer 11 is in one continuous layer while the AtomChip conductive element 12 is under it, beneath the AtomChip's first insulated layer 15 within the etched groove 16*a* in the AtomChip substrate 16 and above the AtomChip's second insulated layer 18.

Figure 6A:
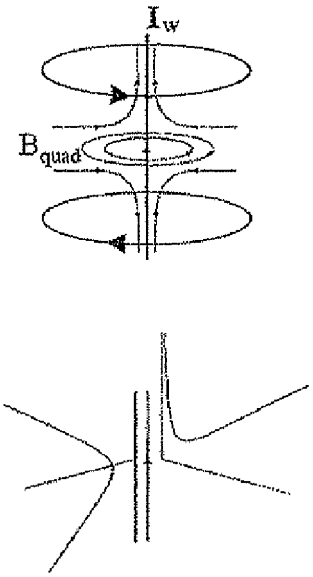
FIGS. 6*a*, 6*b*, 6*c*, and 6*d* show the creation of atom microtraps based on different shapes of the AtomChip conductive element.
Figure 6B:
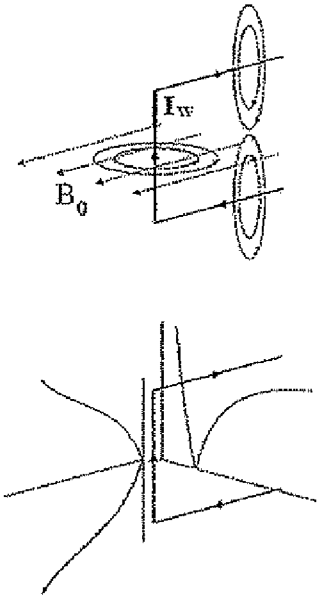
Figure 6C:
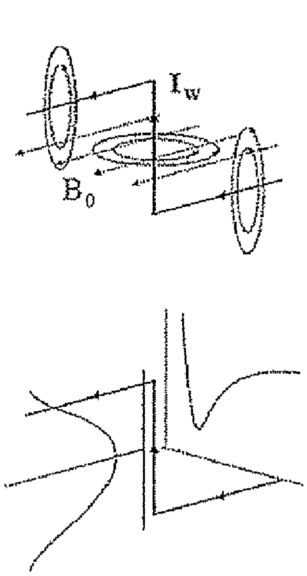
Figure 6D:
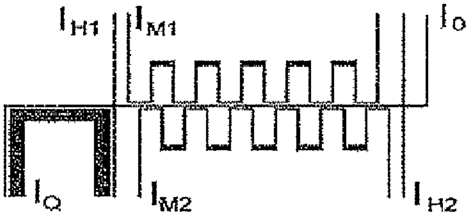

FIGS. 6*a*, 6*b*, 6*c* and 6*d*, which are taken from [2], which is incorporated by reference for all purposes as if fully set forth herein, show the creation of atom microtraps based on different shapes of the AtomChip conductive elements. The upper part of FIGS. 6*a*, 6*b*, and 6*c* shows the geometry of various tapping AtomChip conductive elements in the current and base fields. The lower part of FIGS. 6*a*, 6*b*, and 6*c* shows the radial and axial trapping potential. In figure 6*a* a "straight AtomChip conductive element" on the axis of a quadrupole field Bquad creates a ring-shaped 3-dimensional non-zero trap minimum. In FIG. 6*b* a "U-shaped AtomChip conductive element" creates a field configuration similar to a 3-dimensional quadrupole field with a zero in the trapping center. In FIG. 6*c*, a Ioffe-Pritchard type trap is obtained with a "Z-shaped AtomChip conductive element". In FIG. 6*d* the "conveyor belt AtomChip conductive element" wires are configured in a way that allows transporting atoms from one trap to another along a side guide. Combined with a homogeneous time-independent base field, the currents $I_Q$, $I_{H1}$, $I_{H2}$, are used for the confining fields of source and collecting traps, $I_0$ is the current through the side guide wire. The currents $I_{M1}$ and $I_{M2}$ alternate sinusoidally with a phase difference of $\pi/2$ and provide the moving potential.

The main advantages of the present invention are:

A. An enhancement of quantum phenomena is achieved. An increase of the lifetime of atoms near the surface of an AtomChip device is achieved by making use of AtomChip conductive elements fabricated of special dilute alloys and cooling of these elements down to a working temperature T lower than room temperature. At the same time longer coherence times and smaller heating rates are achieved. These three features provide a significant enhancement in the ability to study quantum phenomena and realize quantum technology applications with the AtomChip. The optimal values of the three features may be achieved by using the dilute alloy for which the resistivity at working temperature T is dominated by the temperature independent residual resistivity and does not exceed the resistivity of gold at room temperature. If the alloy resistivity at said T is equal to the resistivity of gold at room temperature, and the background noise is absent, the lifetime increases by a factor 3.9 for cooling down to T=77 K, by a factor of 15 for T=20 K and by a factor of 71 for T=4.2 K.

B. A new degree of freedom may be achieved. If the background noise restricts the atom lifetime (and other two quality features), the use of a cooled alloy-made AtomChip conductive element (with a well-controlled concentration) in the AtomChip device enables minimizing the AtomChip conductive element resistivity and thereby reduces the Joule heating of the AtomChip device. More accurately, decreasing the solute concentration in the alloy reduce the resistivity (and Joule heating) of the cooled alloy-made wire relative room temperature resistivity (and Joule heating) of Au wires. The resistivity may be reduced down to level, for which the magnetic thermal noise (determined by the ratio $T/\rho$) is kept just below the background noise. The required concentration may be calculated graphically by plotting the dependence of the ratio $T/\rho$ on $\rho$ in a double logarithmic scale. The dependence of alloy resistivity on the solute concentration needed for such plotting is known.

C. An increase in stability is achieved. AtomChip conductive elements made of these alloys are less sensitive to the temperature variations in space and time, than AtomChip conductive elements made of pure metals, because the residual resistivity, comprising a significant part of the total resistivity, is not dependent on temperature.

D. A general family of materials is defined. Each dilute alloy (not only binary) with various (nonmagnetic) components for which the resistivity is dominated by the temperature independent residual resistivity and is less than the one for gold at T=300 K, satisfies our criteria and may be used as a material for the AtomChip's conducting elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An atom chip device for trapping, manipulating and measuring atoms in ultra high vacuum chamber, and for increasing the lifetime of the trapped atoms, the atom chip device comprising:

(a) at least one conductive element, having a flat surface, wherein said at least one conductive element is made of metal, wherein at least part of said metal is a dilute alloy of a nonmagnetic metal, and wherein said at least one conductive element has a working temperature; and (b) a mechanism for causing an electrical current to flow through said at least one conductive element, thereby creating a magnetic field if said electric current is a DC electric current or an electromagnetic field if said electric current is an AC electric current.

2. The atom chip device of claim 1, wherein said lifetime of said trapped atoms exceeds a lifetime of said atoms when trapped in an atom chip device whose conductive elements are made of pure metals by a factor of at least (300 K/working temperature) ×(alloy resistivity at working temperature/metal resistivity at 300 K), the atom chip device further comprising:

(c) a functional layer, having a flat surface, wherein said functional layer is made of metal, wherein at least part of said metal is made of a dilute alloy, and wherein said functional layer is isolated electrically from said conductive element.

3. The atom chip device of claim 2 further comprising:

(d) a substrate, wherein said substrate gives mechanical strength to said atom chip device; and (e) an insulated layer, disposed, on said substrate, wherein said insulated layer electrically insulates said at least one conductive element from said functional layer.

4. The atom chip device of claim 2, wherein said at least one conductive element's flat surface and said functional layer's flat surface are substantially on the same plane.

5. The atom chip device of claim 2, wherein said at least one conductive element's flat surface and said functional layer's flat surface are substantially on different planes.

6. The atom chip device of claim 1 further comprising:

(c) at least two conductive elements, having flat surfaces.

7. The atom chip device of claim 2 wherein said conductive element and said functional layer are both substantially made of said dilute alloy.

8. The atom chip device of claim 1 wherein said at least one conductive element's working temperature is less than room temperature.

9. The atom chip device of claim 1 wherein said at least one conductive element has a geometric shape selected from a group consisting of a straight line, Z-shape, conveyer belt shape, or U-shape.

10. The atom chip device of claim 1 wherein said at least one conductive element has a geometric Z-shape.

11. The atom chip device of claim 1 wherein said at least one conductive element has a geometric U-shape.

12. The atom chip device of claim 1 wherein said at least one conductive element has a geometric conveyer belt shape,

13. The atom chip device of claim 1 wherein said at least one conductive element is made of a dilute alloy metal that has, at said working temperature, lower resistivity and temperature/resistivity ratio values than both resistivity and temperature/resistivity ratio values of gold at room temperature.

14. The atom chip device of claim 1 wherein said at least one conductive element's dilute alloy metal is made of Ag plus x atomic percent of Au, wherein x is at least 1 and at most 5.5 for the working temperature of 77 K, wherein x is at least 0.35 and at most 6 for the working temperature of 20 K, and wherein x is at least 0.1 and at most 6 for the working temperature of 4.2 K.

15. The atom chip device of claim 1 wherein said at least one conductive element's dilute alloy metal is made of Au plus x atomic percent of Ag, wherein x is at least 0.5 and at most 5 for the working temperature of 77 K, wherein x is at least 0.32 and at most 6 for the working temperature of 20 K, and wherein x is at least 0.08 and at most 6 for the working temperature of 4.2 K.

16. An atom chip device for trapping, manipulating and measuring atoms in ultra high vacuum chamber, and for increasing the lifetime of the trapped atoms, the atom chip device comprising:

(a) at least one conductive element, having a flat surface, wherein said at least one conductive element is made of metal, wherein at least part of said metal is a dilute alloy of a nonmagnetic metal, and wherein said at least one conductive element has a working temperature, wherein said at least one conductive element working temperature is less than room temperature, wherein said at least one conductive element has a geometric shape selected from a group consisting of a straight line, Z-shape, conveyer belt shape, or U-shape, and wherein said at least one conductive element is made of a dilute alloy having both resistivity and temperature/resistivity ratio values at said working temperature lower than both resistivity and temperature/resistivity ratio values of gold at room temperature;

(b) a functional layer, having a flat surface, wherein said functional layer is made of metal, wherein at least part of said metal is a dilute alloy metal, and wherein said functional layer is electrically isolated from said conductive element;

(c) a substrate, wherein said substrate gives mechanical strength to said atom chip device;

(d) an insulated layer, disposed on said substrate, wherein said insulated layer electrically insulates said at least one conductive element from said functional layer; and (e) a mechanism for causing an electrical current to flow through said at least one conductive element, thereby creating a magnetic field if said electric current is a DC electric current or an electromagnetic field if said electric current is an AC electric current.

17. The atom chip device of claim 16 wherein said at least one conductive element's dilute alloy metal is made of Ag plus x atomic percent of Au, wherein x is at least 1 and at most 5.5 for the working temperature of 77 K, wherein x is at least 0.35 and at most 6 for the working temperature of 20 K, and wherein x is at least 0.1 and at most 6 for the working temperature of 4.2 K.

18. The atom chip device of claim 16 wherein said at least one conductive element's dilute alloy metal is made of Au plus x percent of Ag, wherein x is at least 0.5 and at most 5 for the working temperature of 77 K, wherein x is at least 0.32 and at most 6 for the working temperature of 20 K, and wherein x is at least 0.08 and at most 6 for the working temperature of 4.2 K.

19. A method of trapping, manipulating and measuring atoms comprising the steps of:

(a) providing an atom chip device including:

(i) at least one conductive element, having a flat surface, wherein said at least one conductive element is made of metal, wherein at least part of said metal is a dilute alloy of a nonmagnetic metal, wherein said at least one conductive element has a working temperature, wherein said at least one conductive element working temperature is less than room temperature, wherein said at least one conductive element has a geometric shape selected from a group consisting of a straight line, Z-shape, conveyer belt shape, or U-shape, and wherein said at least one conductive element's dilute alloy metal is made of an alloy having both resistivity and temperature/resistivity ratio values at temperature lower than both resistivity and temperature/resistivity ratio values of gold at room temperature, (ii) a functional layer, having a flat surface, wherein said functional layer is made of metal, wherein at least part of said metal is a diluted alloy metal, and wherein said functional layer is electrically isolated from said conductive element, (iii) a substrate, wherein said substrate gives mechanical strength to said device, (iv) an insulated layer, disposed on said substrate, wherein said insulated layer electrically insulates said at least one conductive element from said functional layer, and (v) a mechanism for causing an electrical current to flow through said at least one conductive element, thereby creating a magnetic field if said electric current is a DC electric current or an electromagnetic field if said electric current is an AC electric current;

(b) installing said atom chip device inside a chamber, at room temperature and at room pressure, wherein said chamber has the structure of an ultra high vacuum chamber;

(c) closing and sealing said chamber, (d) lowering the pressure inside said chamber;

(e) lowering the temperature of said at least one conductive element;

(f) supplying atoms to the inside of said chamber; and (g) connecting said at least one conductive element to an electricity source.

20. The atom chip device of claim 1, wherein said nonmagnetic metal is selected from the group consisting of copper, silver and gold.

* * * * *